US012671895B1

(12) United States Patent
Fu et al.

(10) Patent No.: US 12,671,895 B1
(45) Date of Patent: Jun. 30, 2026

(54) ARTIFICIAL INTELLIGENCE ENHANCED MOBILE CAMERA INTERFACE

(71) Applicant: Motorola Mobility LLC, Chicago, IL (US)

(72) Inventors: Zhicheng Fu, Chicago, IL (US); Manjushree Bhaskar Aithal, Chicago, IL (US); Anjali Jogeshwar, Bentonville, AR (US); Miao Song, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 75 days.

(21) Appl. No.: 18/988,501

(22) Filed: Dec. 19, 2024

(51) Int. Cl.
*H04N 23/63* (2023.01)
*G06F 16/583* (2019.01)

(52) U.S. Cl.
CPC ....... *H04N 23/632* (2023.01); *G06F 16/5846* (2019.01)

(58) Field of Classification Search
CPC .......................... H04N 23/632; G06F 16/5846
See application file for complete search history.

(56) References Cited

U.S. PATENT DOCUMENTS

| | | | | |
|---|---|---|---|---|
| 12,248,760 | B2 * | 3/2025 | Kim ...................... | G06V 10/469 |
| 2019/0213039 | A1 * | 7/2019 | Lecue ................... | G06N 3/096 |
| 2023/0156317 | A1 * | 5/2023 | Choi ...................... | H04N 23/60 |
| 2025/0080862 | A1 * | 3/2025 | Xiao ..................... | H04N 23/84 |
| 2025/0209407 | A1 * | 6/2025 | Kumar ............... | G06F 18/2415 |
| 2025/0247606 | A1 * | 7/2025 | Mun ................... | H04N 23/632 |
| 2025/0315471 | A1 * | 10/2025 | Dar ......................... | G06F 16/51 |

* cited by examiner

*Primary Examiner* — Marly S Camargo
(74) *Attorney, Agent, or Firm* — FIG. 1 Patents

(57) ABSTRACT

Techniques for artificial intelligence (AI) enhanced mobile camera interfaces are described and are implementable to save users from providing complex and tedious inputs to take pictures. In implementations, a mobile device modifies, based at least in part on user instructions to the mobile device and using an artificial intelligence model, an image preview of a camera field of view presented on the mobile device. The image preview is replaced with a modified image preview generated by the artificial intelligence model based on the user instructions. The mobile device generates, responsive to detecting a capture command and using the artificial intelligence model, a captured image for display as a final image within a user interface based at least in part on the modified image preview.

20 Claims, 10 Drawing Sheets

Device
600

Memory Device(s)
612

Device Data
604

Device
Applications
614

Camera
Application
114

Operating
System
616

Processor
System
608

Processing
& Control
610

Power
Sources
624

Camera
618

Camera
104

Audio / Video
Processing
626

Wireless Module
622

Communication
Transceiver(s)
602

Data Input
Port(s)
606

Media Data
Port
632

Motion
Sensors
620

Audio
System
628

Display
System
630

ARTIFICIAL INTELLIGENCE ENHANCED MOBILE CAMERA INTERFACE

BACKGROUND

Advancements in mobile camera technology cause people to rely on smartphones for photography. Many modern mobile cameras offer advanced features like burst shot, auto-lighting, auto-focus, and object detection, along with post-processing capabilities such as manual or automatic edits and enhancements. However, existing camera user interfaces can be complex, and efficiently navigating to various individual camera controls can be tedious. Users often have to repeat adjustments before or after taking each photo, and some camera interfaces rely on cloud pre or post processing, which raises privacy concerns. Complex mobile camera interfaces cause frustration and interrupt users from capturing the moment. As a result, many users forgo advanced features of camera interfaces, use default settings, and possibly produce lower-quality or less exciting images.

BRIEF DESCRIPTION OF THE DRAWINGS

Aspects of artificial intelligence (AI) enhanced mobile camera interfaces are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
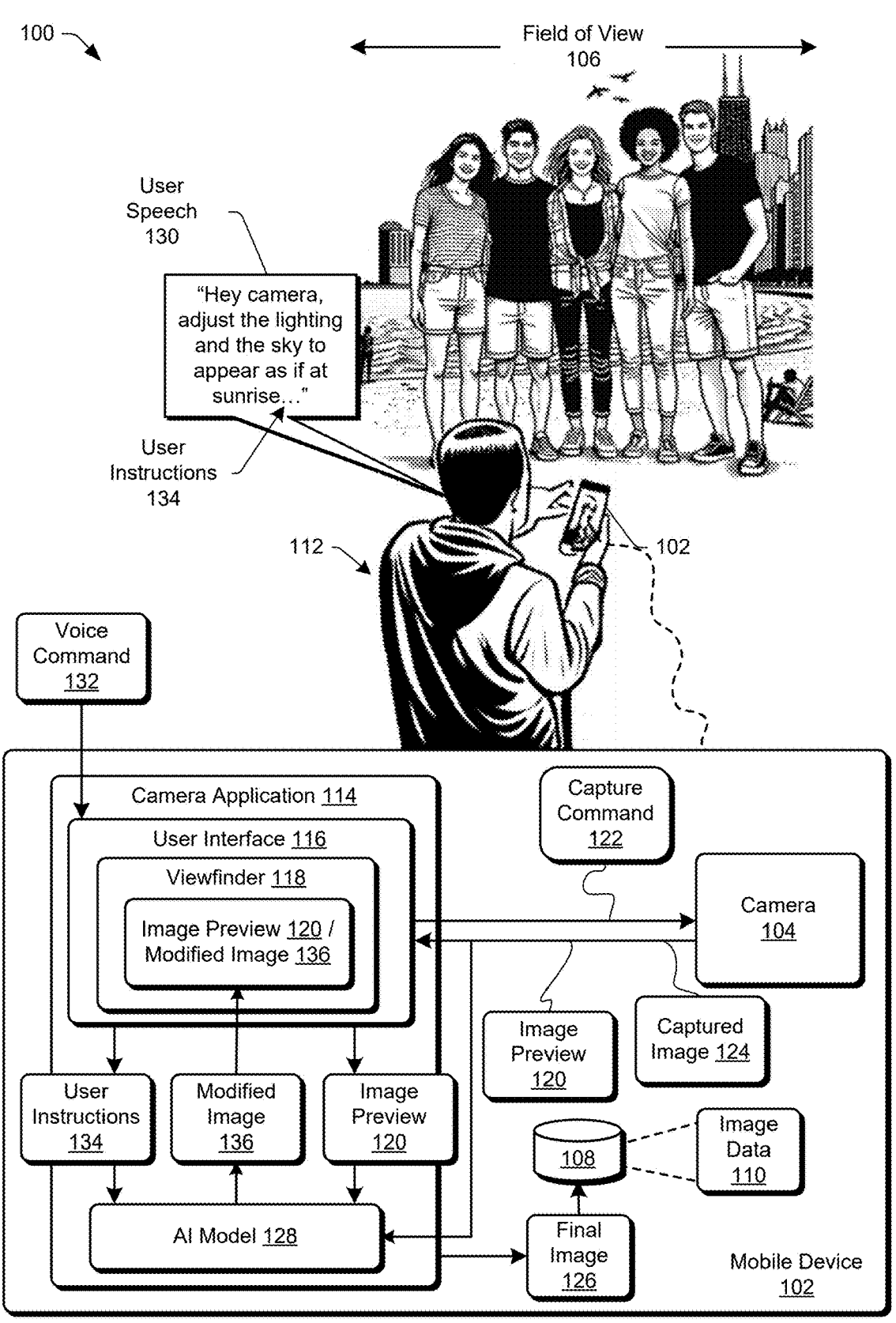
FIG. 1 illustrates an example environment in which aspects of AI enhanced mobile camera interfaces can be implemented in accordance with one or more implementations.

Techniques for artificial intelligence (AI) enhanced mobile camera interfaces are described and are implementable to save users from providing complex and tedious inputs at a camera user interface to control how an image is captured. As mentioned above, several factors influence quality of a user experience for capturing images with a mobile device camera, including diverse user tastes and preferences for taking pictures in different situations. A generative AI model is described that uses voice command inputs to apply modifications to images automatically based on user instructions derived from the voice commands. Automatic modifications, such as image enhancements, image feature manipulations, lighting effects and the like, are previewed in a viewfinder, and then automatically applied by the model to a final image that is captured. The final image includes the same modifications as previewed in the viewfinder being applied to a captured image.

In at least one implementation, a mobile device, such as a mobile phone, includes a camera controlled by at least one processor to frame a field of view of an environment. A memory of the mobile device maintains image data (e.g., images and video) generated using the camera. The mobile device executes a camera application that manages a user interface of the camera to receive user inputs for controlling the camera and capturing images.

Imagine a user is holding the mobile device and pointing a lens of the camera such that the field of view encompasses a group of friends posing in the environment for a group picture. The camera application causes the user interface to present a camera viewfinder showing an image preview of the field of view. As the user holds the mobile device in different orientations and angles to adjust a scene captured by the field of view, the camera outputs the image preview for display in the camera viewfinder to aid the user with visual feedback. The image preview, for example, is updated to reflect near real-time changes to the appearance of the scene from different camera positions, orientations, and perspectives.

When the user is happy with the image preview, the mobile device receives user input, which registers at the user interface as a capture command. For example, the user interface detects touch, voice, or gesture inputs at the user interface to command the camera to take a picture of the scene framed by the camera viewfinder. The camera application forwards the capture command detected at the user interface to the camera, which causes the camera to output a captured image of the field of view.

In some examples, the camera application outputs the captured image to the memory to be stored as a final image among the image data. In some situations, however, the user requests AI assistance from the camera application to modify the image preview shown in the camera viewfinder before selecting the capture command. For example, the camera application may generate the final image using an AI model 128 of the camera application, which applies various image modifications and effects to the captured image prior to being stored with the image data maintained in the memory.

For instance, when the mobile device executes the camera application, the processor may launch the AI model as well. The AI model is configured to process voice commands received at the camera user interface to cause user specified image modifications and effects to be applied to the image preview, automatically. The AI model may include one or more machine-learning models (e.g., neural networks, large language models, generative models, multimodal models) configured to output final images that include same modifications applied to captured images as are applied to corresponding image previews when the pictures are taken.

Picture the user speaking into a microphone of the mobile device. The microphone picks up user speech, describing a voice command, "Hey camera, add a rainbow to the background and apply lighting effects to simulate purplish skies." The camera application processes the voice command to extract user instructions. The user instructions, for example, include transcribed text of the voice command or portions thereof. In this example, the user instructions include text stating, "add a rainbow in the background, and to add lighting effects to simulate a purple sky."

The AI model receives the user instructions as input, in addition to receiving the image preview output from the camera and being shown in the camera viewfinder. Based on the inputs, the AI model generates a modified image based on the user instructions. For example, the AI model renders the modified image to include a machine-learning based rendering of a rainbow positioned in the background of the image preview shown in the camera viewfinder. In addition, the modified image output from the AI model includes color variations to show how the lighting effects and purple sky might appear after the picture is taken. The modified image is output in the viewfinder to replace the image preview received from the camera.

In response to detecting a capture command at the user interface, the AI model produces the final image by applying same modifications to the captured image as applied by the AI model to the image preview when generating the modified image. The AI model may receive the captured image from the camera and cause the final image to blend the captured image with the appearance of the modified image being previewed by the user before the capture command is received. The camera application outputs the final image to be stored with the image data maintained in the memory. For example, the final image is stored in an image gallery of the mobile device, e.g., to be shared later with the people in the image.

The techniques described enable a camera application on mobile devices to enhance user experiences through AI. A camera application utilizing these techniques can provide a seamless experience by allowing users to take pictures that include modifications based on their preferences, such as historical choices and current voice commands. By configuring the camera viewfinder to automatically display generative AI modifications to captured images based on voice commands, these techniques simplify interactions with conventional camera interfaces. The AI model operates locally within the camera application executing on the processor of the mobile device, which avoids cloud communication to improve performance and addresses privacy concerns. This AI-enhanced camera application empowers users to effectively utilize advanced capturing settings, resulting in more exciting or higher quality images being generated in real time, including to avoid extensive editing later (e.g., after the images are taken).

While features and concepts of embedding nearby user presence within captured images can be implemented in any number of environments and/or configurations, aspects of the techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of AI enhanced mobile camera interfaces can be implemented in accordance with one or more implementations. The environment 100 includes a mobile device 102 with a camera 104. The mobile device 102 represents any camera enabled device, such as a mobile phone, a tablet device, a laptop computer, a wearable device, and so forth, operable to capture images of the environment 100 and perform operations in response to user inputs, including tactile, audible, and visual inputs. The camera 104 may be a front facing or rear facing camera of the mobile device 102.

Multiple cameras, lenses, and camera components may be integrated as a single camera system represented by the camera 104. The mobile device 102, with the camera 104, can represent any type of an electronic and/or computing device implemented with various components, such as a processor system and memory, as well as any number and combination of different components as further described with reference to the example device 600 shown in FIG. 6.

In at least one implementation, the camera 104 is controlled by at least one processor of the mobile device 102 to frame images that capture a field of view 106 of the environment 100. A memory 108 of the mobile device is operatively coupled to the processor and configured to maintain image data 110 (e.g., images and video) generated using the camera 104 to take pictures of the field of view 106. Imagine a user 112 is holding the mobile device 102 and pointing a lens of the camera 104 such that the field of view 106 encompasses a group of friends posing in the environment 100 for a group picture. The mobile device executes a camera application 114 that manages a user interface 116 of the camera.

The camera application 114, and components thereof, may be implemented as a module that includes independent processing, memory, and/or logic components functioning as a computing and/or electronic device integrated with the mobile device. In at least one implementation, the camera application 114 includes one or more modules, which are executed in an application execution environment of the mobile device 102 (e.g., an operating system executed by a central processing unit or CPU of the mobile device 102). The camera application 114 may represent one or more programs, threads, services, or executables. Alternatively or in addition, the camera application 114, and components thereof, can be implemented as a software application or software module, such as integrated with the operating system running on the CPU, for instance, based on computer-executable instructions loaded in memory or storage of the mobile device 102. As software applications or modules, the camera application 114, and supporting components of each may also be implemented as one or more artificial intelligence algorithms and/or machine learning algorithms. Alternatively or in addition, the camera application 114, and related parts of each may be implemented in firmware and/or at least partially in computer hardware. For example, at least part of the camera application 114 is executable as firmware, and another part is implemented by a software executable, and another part is implemented in logic or circuitry of the mobile device 102.

The user interface 116, for example, is configured to receive inputs from the user 112 to control the camera 104 and take the group picture. The user interface 116 is configured to receive multi-modal user inputs (e.g., a combination of touch input, gesture input, and voice input), in at least one example. For example, the user interface 116 includes a graphical or visual aspect (e.g., a graphical user interface or so called GUI) that the user 112 interacts with using gesture or touch inputs, and a speech enabled aspect (e.g., a voice enabled user interface) that the user 112 interacts with by speaking (e.g., into a microphone of the camera 104 or the mobile device 102).

In at least one implementation, the camera application 114 causes the user interface 116 to present a viewfinder 118 including an image preview 120 of the field of view 106. For example, as the user 112 holds the mobile device 102 in different orientations and angles to frame a scene captured by the field of view 106, the camera 104 generates the image preview 120 to be output for display in the viewfinder 118.

The camera application 114, for instance, quickly refreshes the viewfinder 118 to display updated image previews that reflect (e.g., in near real-time) variations in the appearance of the scene when the user 112 holds the mobile device 102 at different camera positions, orientations, angles, and perspectives. As one example, the camera application 114 updates the viewfinder 118 by causing the camera 104 to repeatedly generate new versions of the image preview 120. The viewfinder 118 may be repeatedly refreshed before the user 112 provides additional input to take a picture.

When the user is happy with the image preview 120 depicted in the viewfinder 118, the mobile device 102 receives user input, which registers at the user interface 116 as a capture command 122. For example, the user interface 116 detects touch, voice, or gesture inputs at one or more input devices (e.g., microphones, touchscreens, sensors) the mobile device 102 to command the camera 104 to take a picture of the scene framed within the viewfinder 118. The camera application 114 outputs the capture command 122 detected at the user interface 116 to the camera 104, which causes the camera 104 to output a captured image 124 of the field of view 106.

In some examples, the camera application 114 outputs the captured image 124 to the memory 108 to be stored among the image data 110 as a final image 126. For example, the captured image 124 is used as the final image 126 that is output from the camera application 114 in response to detecting the capture command 122.

In other situations, the user 112 requests AI assistance from the camera application 114 for modifying the image preview 120 shown in the viewfinder 118 before the capture command 122 is selected. For example, the camera application 114 may generate the final image 126 using an AI model 128 of the camera application 114 to apply various image modifications and effects to the captured image 124 for producing the final image 126. The AI model 128 may be executed (e.g., launched) by the processor of the mobile device 102 when the camera application 114 starts. As the mobile device 102 executes the camera application 114, the processor may execute the AI model 128 in the background, as well.

With the AI model 128 executing in the background of the camera application 114 and the user interface 116, the AI model is configured to process voice commands received at the user interface 116 to cause various image modifications and effects to be applied to the image preview 120, automatically. The AI model 128 may include one or multiple machine-learning models (e.g., neural networks, large language models, generative models, multimodal models). The one or more models of the AI model 128 are configured to output final images that include same modifications applied to captured images that are applied to corresponding image previews when the pictures are taken.

In the depicted scenario, the user 112 speaks into a microphone of the mobile device 102. The microphone picks up user speech 130, describing a voice command 132, "Hey camera, adjust the lighting and the sky to appear as if at sunrise." The camera application 114 processes the voice command 132 received to extract user instructions 134. For example, the camera application 114 uses an audio transcriber to convert the user speech 130 into transcribed text of the voice command 132 or portions thereof. In this example, the user instructions 134 include text based on a transcription of the voice command 132, which describes, "add lighting effects and color to sky to simulate a sunrise." The camera application 114 provides the user instructions 134 as input to the AI model 128. In addition, the image preview 120 output from the camera 104 and being shown in the viewfinder 118 is received, e.g., from the camera application 114, as another input to the AI model 128. Based on the inputs, the AI model 128 generates a modified image 136 based on the user instructions 134. For example, the AI model 128 creates the modified image 136 to include a machine-learning based recoloring of the background and lighting of the image preview 120 according to the user instructions 134 (e.g., user requests related to image brightness, contrast, saturation, denoise, high dynamic range, etc.). The modified image 136, for example, includes color variations relative the image preview 120 to show how the user request lighting effects simulated sky conditions may appear when the camera 104 takes a picture.

For example, in response to detecting the capture command 122 at the user interface 116, the AI model 128 produces the final image 126 by applying same modifications to the captured image 124 as are applied by the AI model 128 to the image preview 120 for generating the modified image 136. For example, the AI model 128 receives the captured image 124 from the camera 104 and causes the final image 126 to combine the captured image 124 with the appearance of the modified image 136 being previewed through the viewfinder 118 before the capture command 122 is received.

The camera application 114 outputs the final image 126 generated by the AI model 128 to be stored among the image data 110 maintained in the memory 108. For example, the image data 110 is configured as an image gallery of the mobile device 102, from which the final image 126 is viewed or shared with users of other devices.

The techniques described enable the camera application 114 executing on mobile device 102 to enhance a camera experience of the user 112, through AI assistance provided by the AI model 128, which is integrated within the camera application 114 itself. This way, the camera application 114 is operable to provide a seamless experience by allowing the user 112 to take pictures that include modifications based on their preferences, including historical choices learned by the AI model 128 overtime (e.g., from previous interactions and voice commands, from a conversation history associated with the AI model 128, etc.). By configuring the viewfinder 118 of the camera application 114 to automatically display generative AI modifications to captured images based on voice commands, user interactions with the user interface 116 are simplified. And, in implementations where the AI model 128 operates locally within the camera application 114 executing on the processor of the mobile device 102, the techniques avoid cloud communication, which improves performance and heightens privacy and security. The AI model 128 empowers the camera application 114 to help the user 112 effectively utilize advanced capturing settings of the camera application 114, resulting in more exciting or higher quality images generated in real time, without having to perform extensive editing after the images are output.

Figure 2:
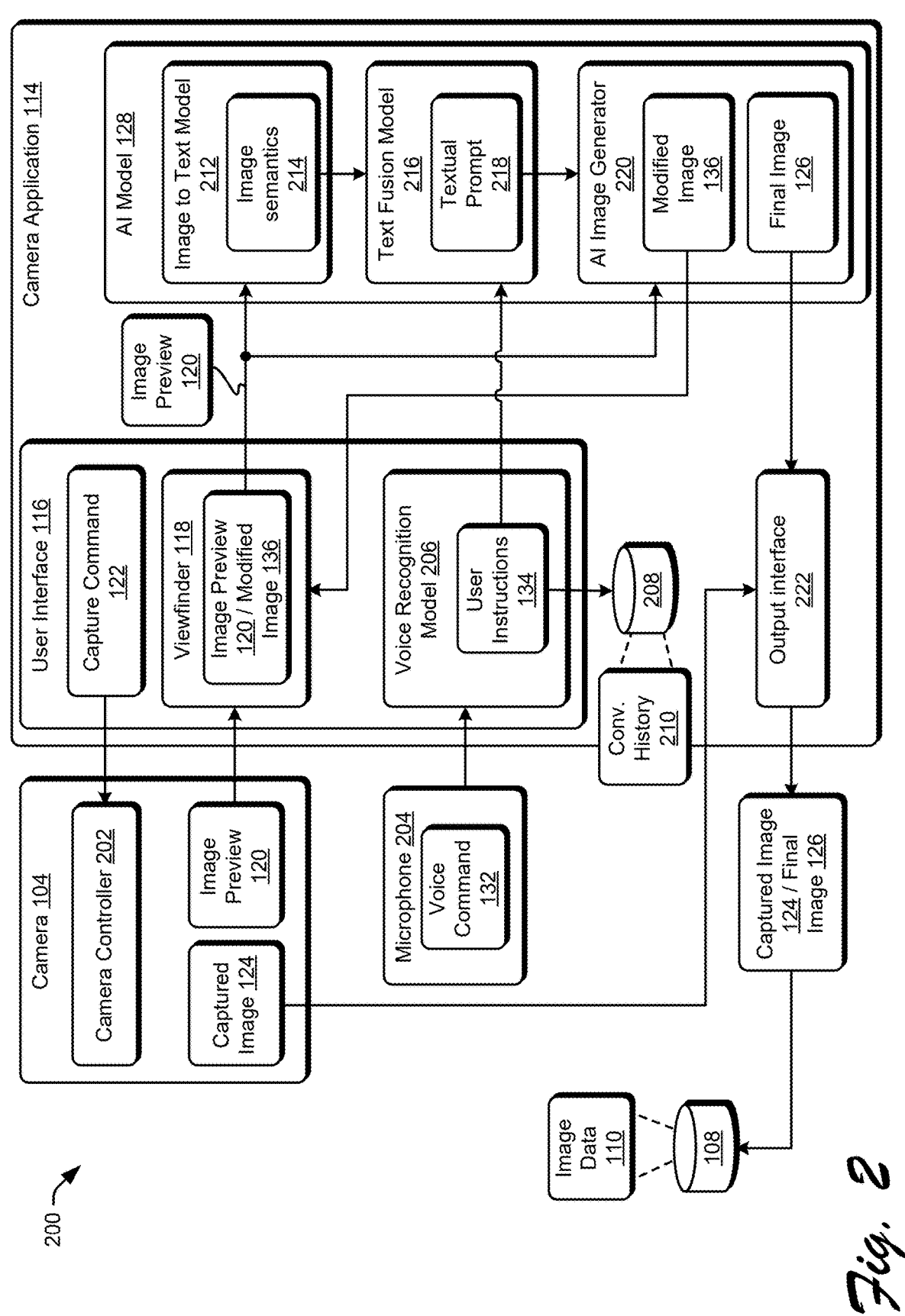
FIG. 2 depicts a block diagram of an example system that can be implemented for AI enhanced mobile camera interfaces in accordance with one or more implementations.

FIG. 2 depicts a block diagram of an example system 200 that can be implemented for AI enhanced mobile camera interfaces in accordance with one or more implementations. For example, the system 200 is described in the context of the environment 100 and being implemented on the mobile device 102 using similarly labeled elements as FIG. 1. The system 200, may include a processing system (e.g., at least one processor) and a memory system configured to execute instructions of the camera application 114 for generating pictures captured with the camera 104 among the image data 110.

The camera 104 in this example includes a camera controller 202 that receives the capture command 122 from the camera application 114 based on input from the user 112. In response to the capture command 122, the camera controller 202 causes the camera 104 to generate the captured image 124 to be consistent with the image preview 120 shown in the viewfinder 118 just prior, just after, or at approximately the same time the capture command 122 is received.

The system 200 also includes a microphone 204. The microphone 204, for example, enables the mobile device 102 to receive the voice command 132 when the user 112 requests AI assistance from the AI model 128. The microphone 204, for example, includes a transducer that captures an audio signal in the environment 100 based on the user speech 130. The audio signal is output from the transducer as a digital recording of the voice command 132. The voice command 132 (e.g., audio data) is output from the microphone 204 and received by the user interface 116.

The user interface 116 is illustrated with a voice recognition model 206. The voice recognition model 206 is implemented as part of one or more of the camera application 114, the user interface 116, and the AI model 128. The voice recognition model 206 is configured to extract the user instructions 134 when the voice command 132 is received from the microphone 204. For example, the user instructions 134 include text describing camera operations, image settings, and image features to be added, removed, or modified, at the discretion of the user 112. The voice recognition model 206 may leverage deep learning techniques to understand and process spoken language, for instance, adopting Recurrent Neural Networks (RNNs) or Transformer architectures to handle the sequential nature of speech data. The voice recognition model 206 may use an Automatic Speech Recognition (ASR), which converts spoken words from the voice command 132 into text of the user instructions 134. The user instructions 134 can be analyzed using Natural Language Processing (NLP) to understand intent of the user 112. The voice recognition model 206 may be trained on datasets of voice samples (e.g., of the user 112, of other users) to improve accuracy and may recognize different accents and languages.

The voice recognition model 206 may incorporate contextual understanding to provide more relevant responses based on previous interactions. In at least one example, the user instructions 134 and/or the voice command 132 are added to a long term memory 208 of the camera application 114, the user interface 116, the AI model 128, or other part of the system 200, which is accessible to the AI model 128. The long term memory 208 stores the information obtained from processing the voice command 132 and/or the user instructions 134 as part of a conversation history 210 maintained between the user 112 and the camera application 114 (e.g., the AI model 128). For example, the AI model 128 accesses the conversation history 210 to improve performance and configure the AI model 128 to respond to user requests quickly using previous stated preferences, camera settings, image modifications. As one example, modifications made to produce a first final image are based on similar modifications requested by the user 112 to produce a similar, second final image.

In this example of the AI model 128, the image preview 120 and the user instructions 134 are received as inputs. The AI model 128 outputs either the modified image 136 or the final image 126 generated from the inputs. The modified image 136 is output to the viewfinder 118 to replace the image preview 120 provided from the camera 104. The final image 126 is output when the capture command 122 is detected by applying differences between the modified image 136 and the image preview 120 to achieve similar modifications to the captured image 124 captured by the camera 104.

The AI model 128 includes an image to text model 212, a text fusion model 216, and an AI image generator 220. The image to text model 212 is configured to receive the image preview 120 being input to the AI model 128 to extract image semantics 214.

For example, the image to text model 212 is a machine-learned model, such as a Convolutional Neural Network (CNN), configured to receive images, analyze, and understand the content of the images, and generate textual descriptions of the features that are visible from the images. A neural network of the image to text model 212, for instance, determines the image semantics 214 to describe visible details depicted in the image preview 120. The image to text model 212 extracts features from the image preview 120 using multiple layers of convolutions, which may be passed through a Recurrent Neural Network (RNN) or Transformer to generate a coherent description of the image preview 120. The model 212 may be trained on large datasets containing images paired with descriptive text, allowing the model 212 to learn the relationships between visual elements and corresponding semantic meanings. The model 212 may generate accurate and contextually relevant descriptions as the image semantics 214, including to identify and classify objects, actions, and scenes depicted within the image preview 120. The image semantics 214, for instance, include a description indicating the image preview 120 shows five people, standing on a boardwalk, which is near a beach, and which is near an urban lake next to an urban environment of a large city, etc.

The text fusion model 216 is configured to generate a textual prompt 218 to control the AI model 128 based on a combination of the user instructions 134 and the image semantics 214. For example, the text fusion model 216 is a machine-learned model configured to receive two sets of descriptions (e.g., text data) and combine the descriptions into a prompt for input to another machine-learned model. Specifically, the user instructions 134 and the image semantics 214 are combined by the text fusion model 216 to configure the textual prompt 218 for input to the AI image generator 220. The textual prompt 218 combines the transcription of the voice command 132 or the transcription of the user instructions 134 with the image semantics 214 including semantic information extracted by the image to text model 212 from the image preview 120. In at least one example, the text fusion model 216 receives the conversation history 210, or relevant portions thereof, as an additional input with the user instructions 134 and the image semantics 214. The text fusion model 216 is able to craft a more accurate and relevant version of the textual prompt 218 using additional information about the user 112 and past experiences the user 112 has interacting with the camera application 114.

The AI image generator 220 modifies the image preview 120 based on the textual prompt 218 describing the user instructions 134 extracted from the voice command 132, in relation to the image semantics 214. For example, the AI image generator 220 is a generative AI model (e.g., a neural network, a multimodal large language model) configured to combine the voice command 132 (e.g., the user instructions 134) and the image semantics 214 to produce a detailed modification plan for altering the image preview 120 into the modified image 136. The plan may be implemented by a Generative Adversarial Network (GAN) or a Transformer-based model, which alters the image preview 120 accordingly. The output from the AI image generator 220 is the modified image 136, which accurately reflects the user speech 130 into the user instructions 134, thereby enabling intuitive and dynamic pre- and pos-capture image editing.

The AI model 128 enables the system 200 of the mobile device 102 to allow the user 112 to easily interact with both pre-capture camera tuning and post-capture editing of images, as a seamless user experience when taking pictures with the camera 104. The user interface 116 enables seemingly real-time photo editing and/or re-touching controlled by the voice command 132 and the user instructions 134. The modified image 136 may be iteratively updated using generative AI techniques implemented by the AI image generator 220 and adopted by the AI model 128. When shown in the viewfinder 118 in place of the image preview 120, each iteration of the modified image 136 gives the user 112 control over the final image 126 that is to be output from the camera application 114 to have the same features as the modified image 136 being previewed in the user interface 116.

An output interface 222 of the camera application 114, for example, outputs the captured image 124 generated by the camera 104 or the final image 126 generated by the AI model 128 to the memory 108 to be stored with the image data 110. The captured image 124 is output, for example, when the user 112 does not provide the voice command 132 or otherwise does not request AI assistance from the camera application 114. In other cases, however, when the voice command 132 is spoken into the microphone 204, the final image 126 is output from the output interface 222. In at least one example, the captured image 124 and the final image 126 (e.g., the modified version of the captured image 124) are both output to the memory 108 to be stored with the image data 110.

Figure 3A:
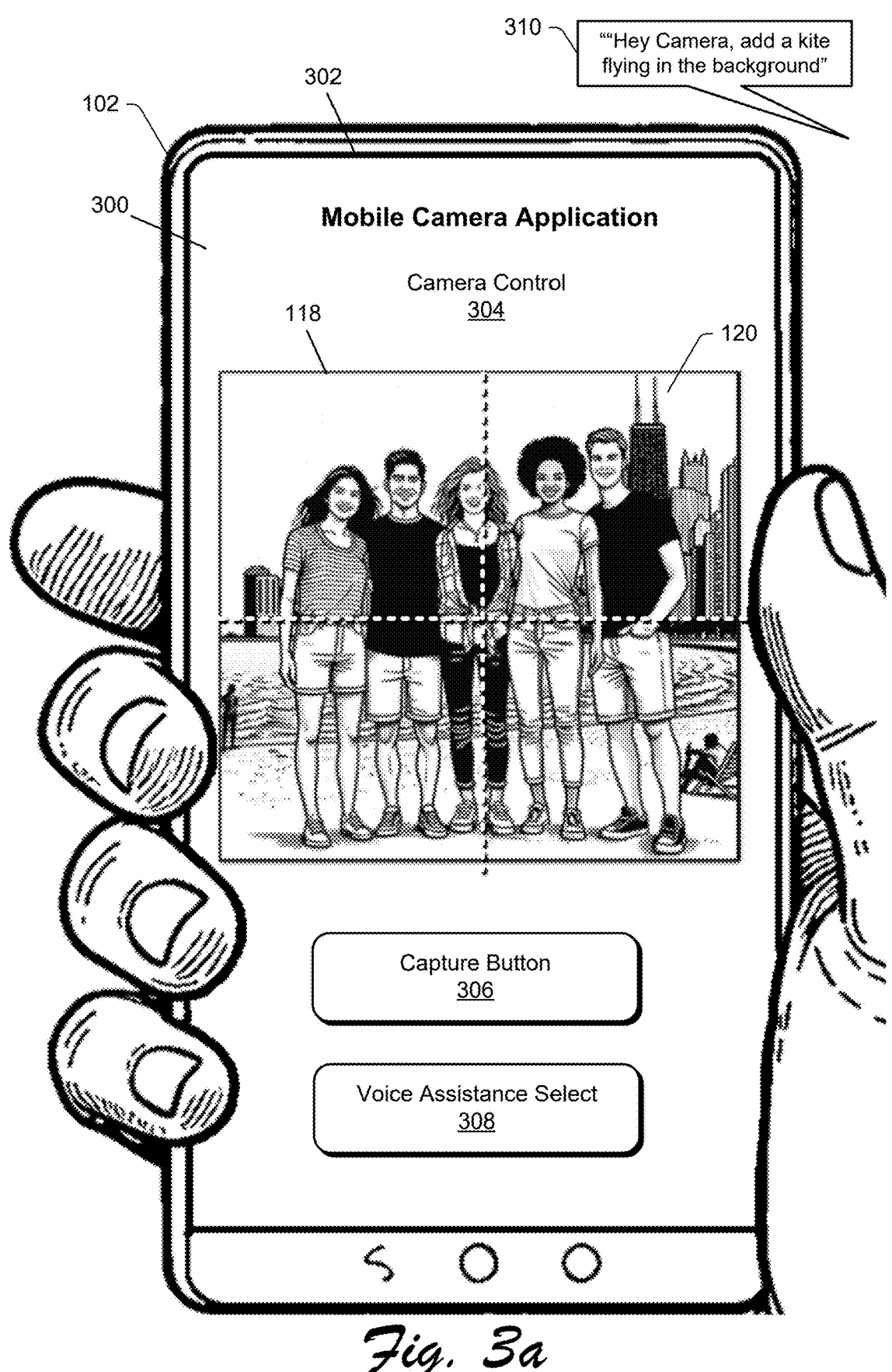
FIG. 3*a* depicts an example graphical user interface (GUI) in accordance with one or more implementations.
Figure 3B:
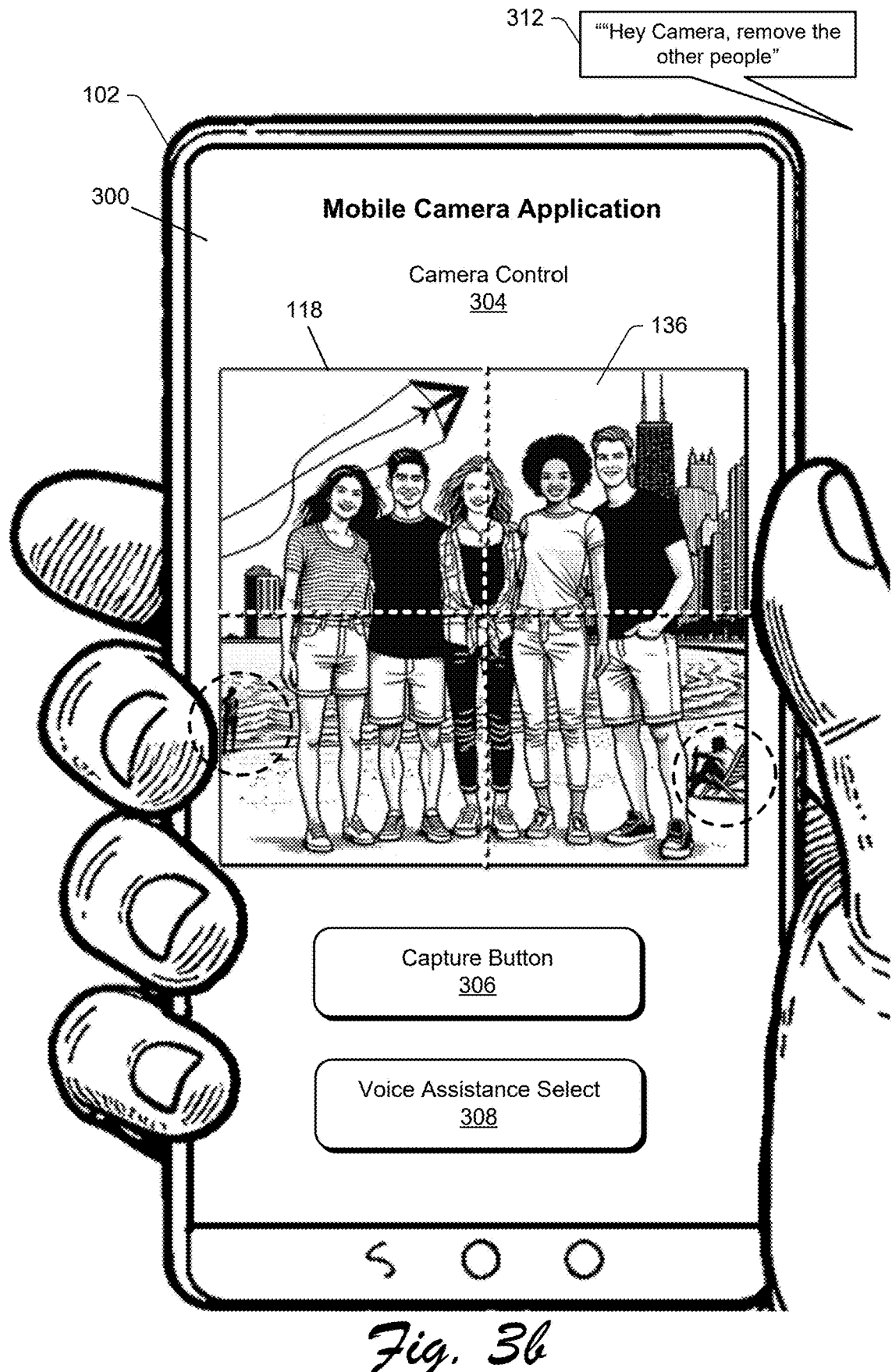
FIG. 3*b* depicts an example GUI in accordance with one or more implementations.
Figure 3C:
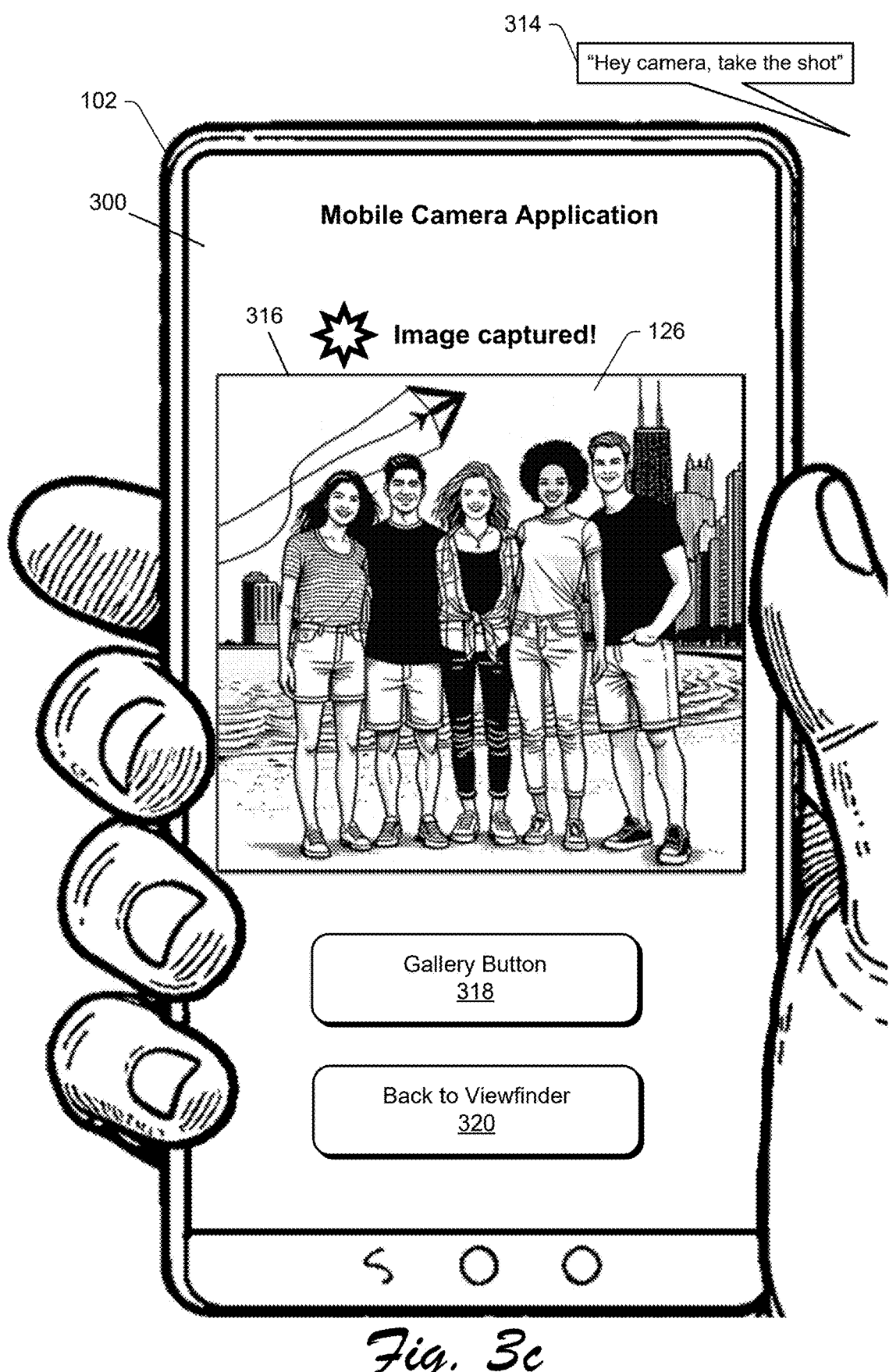
FIG. 3*c* depicts an example GUI in accordance with one or more implementations.

FIG. 3a, FIG. 3b, and FIG. 3c each depict an example graphical user interface (GUI), which is labeled as GUI 300. The GUI 300, for instance, can be implemented on the mobile device 102 and incorporates attributes of the environment 100 and the system 200 introduced above. The camera application 114 controls the GUI 300 to provide access to the camera 104, and additional capability enabled by the AI model 128. When the camera application 114 is executed by a processor of the mobile device 102, for example, the user interface 116 causes a touchscreen of the mobile device 102 to present the GUI 300 and receive user inputs as the user 112 interacts with the GUI 300.

FIG. 3a depicts aspects of the GUI 300 in accordance with one or more implementations. The GUI 300 depicted in FIG. 3a is presented on a display screen 302 of the mobile device 102 to show a camera control 304 for controlling the camera 104. The viewfinder 118 is included in a center region of the camera control 304 for previewing the captured image 124 or the final image 126 to be output from the camera application 114 if the capture command 122 is detected at that moment. For example, the viewfinder 118 includes the image preview 120 received from the camera 104.

The camera control 304 of the user interface 116 further includes a capture button 306 and a voice assistance selection 308 depicted as selectable graphical elements. For example, the user 112 touching the capture button 306 with a stylus or finger causes the user interface 116 to detect the capture command 122 that is then forwarded to the camera controller 202. The voice assistance selection 308, when selected, outputs a graphical or audible message generated by the AI model 128 to let the user 112 know the AI model 128 is operational and listening for a voice command 310, which is an example of the voice command 132. For example, the camera application 114 causes the display or a speaker of the device to output a message stating in audio or text output that the AI model 128 is listening and waiting for the voice command 310.

The user 112 speaks the voice command 310, which is detected by the microphone 204 and transcribed into the user instructions 134. For example, the user instructions 134 describe "add a kit flying in a background region" based on the user speaking, "Hey Camera, add a kite flying in the background."

FIG. 3b depicts aspects of the GUI 300 in accordance with one or more implementations. The GUI 300 depicted in FIG. 3b illustrates aspects of the AI model 128 being configured to generate the modified image 136 by at least one of adding, removing, or manipulating image features requested by the user instructions 134. For example, in response to the voice command 310 received just prior, the AI model 128 outputs the modified image 136 for inclusion in the viewfinder 118, to depict the image preview 120 after being modified to add an additional image feature (e.g., a kite) to the background. After presenting the modified image 136 including the additional image feature not found in the image preview 120, a second user request is received by the AI model 128. For instance, a voice command 312 is detected from the user 112. The user instructions 134 extracted from the voice command 312 describe "remove people from the background region" based on the user 112 speaking, "Hey Camera, remove the other people." In one or more other examples, the voice commands received by the camera application 114 include image feature manipulations and image effects. For example, the user instructions 134 may state, "move the kite further to the left," to cause the features of the modified image 136 to change.

FIG. 3c depicts aspects of the GUI 300 in accordance with one or more implementations. The GUI 300 depicted in FIG. 3c illustrates aspects of the AI model 128 being configured to generate image results 316 included in the GUI 300 to present the final image 126 having the image features requested by the user instructions 134. For example, in response to the voice command 314 where the user speaks "Hey Camera, take the shot", the camera application 114 outputs the capture command 122, which causes the AI model 128 to output the final image 126 through the output interface 222. As depicted in the image results 316, the final image 126 includes the each of the modifications requested from the voice command 310 and the voice command 312 (e.g., to add the kite and remove the other people). A selectable element 318 navigates from the GUI 300 to a gallery application to interact with the final image 126. A selectable element 320 navigates the GUI 300 back to the camera control 304.

Figure 4A:
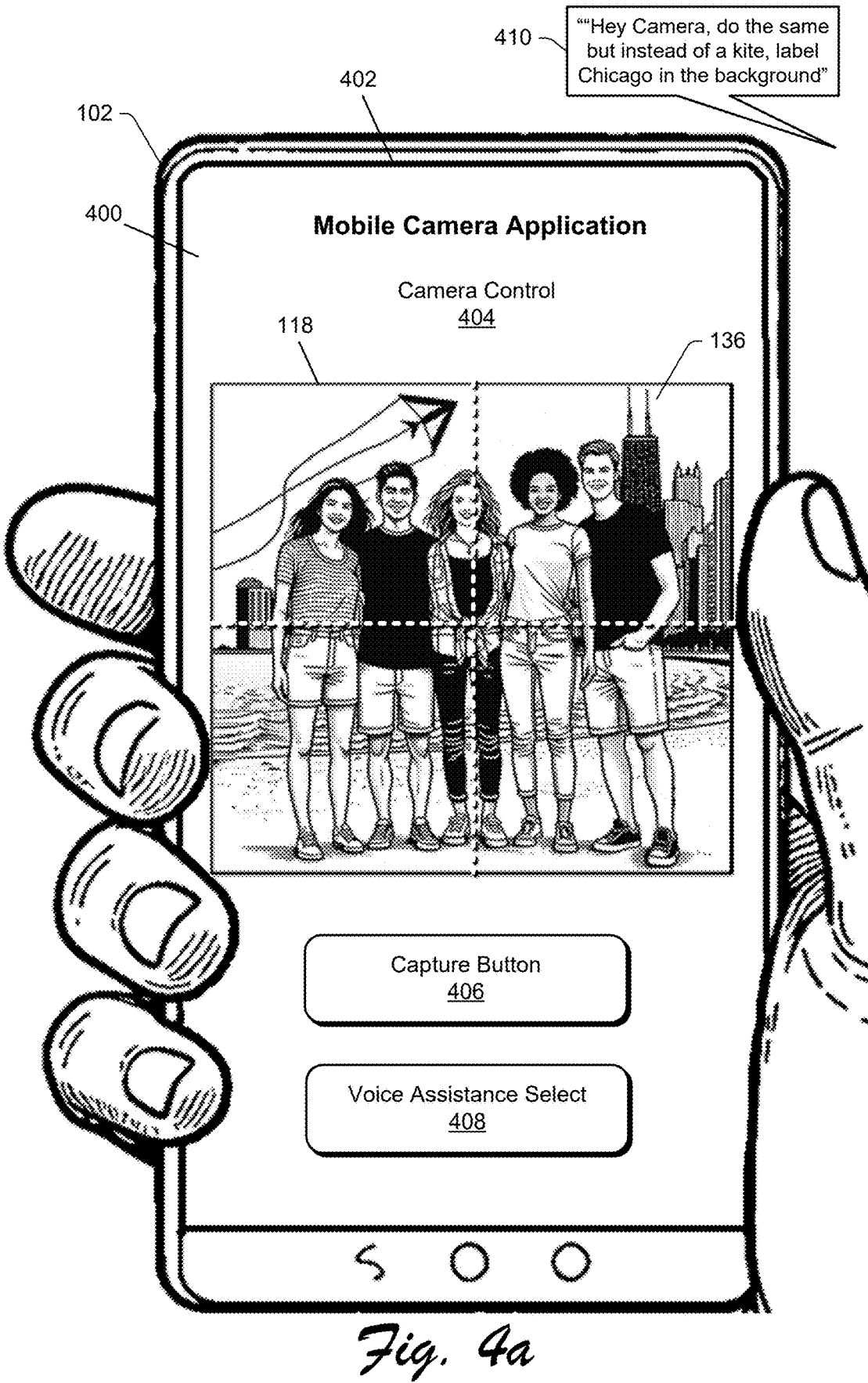
FIG. 4*a* depicts an example GUI in accordance with one or more implementations.
Figure 4B:
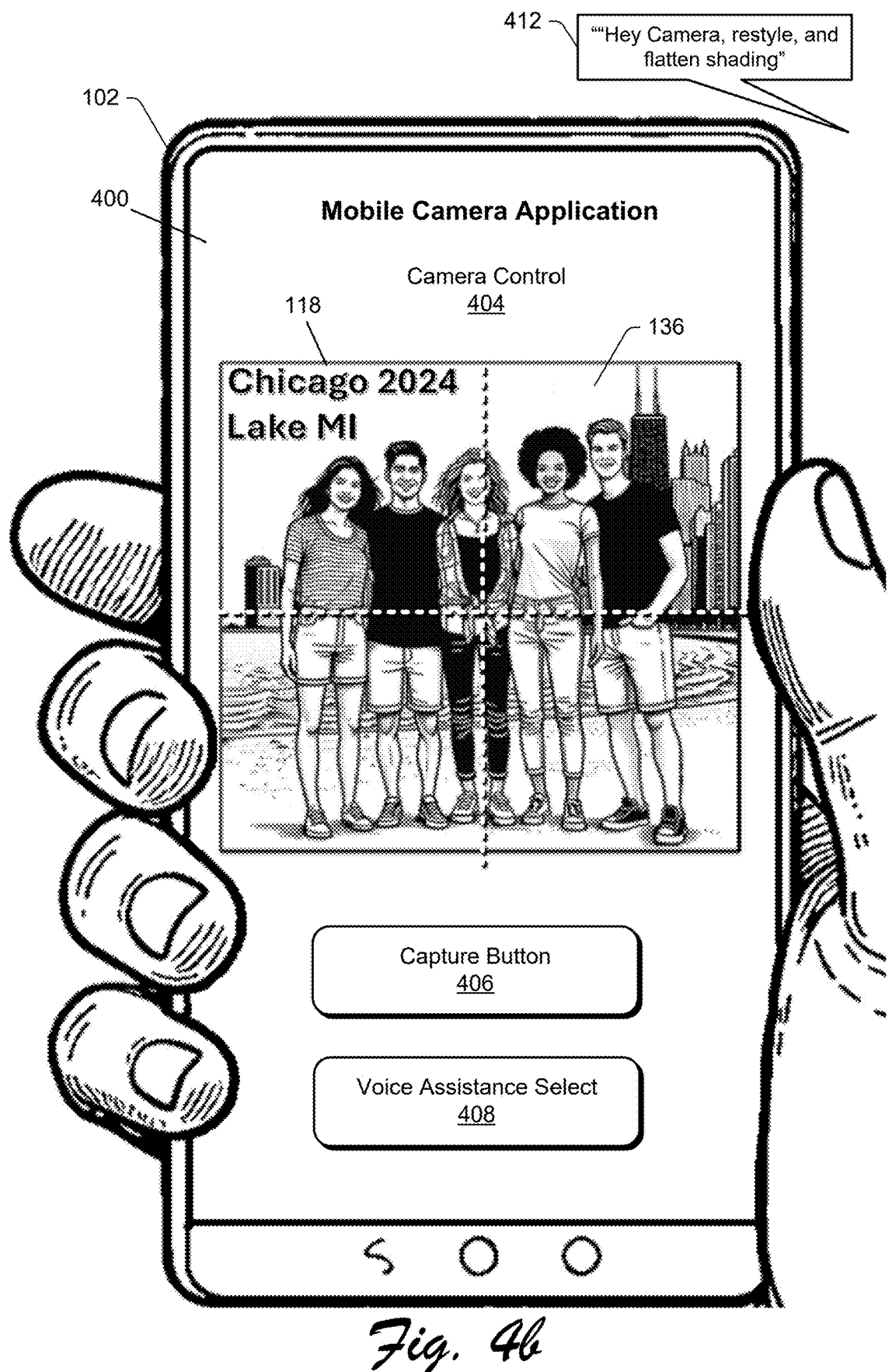
FIG. 4*b* depicts an example GUI in accordance with one or more implementations.
Figure 4C:
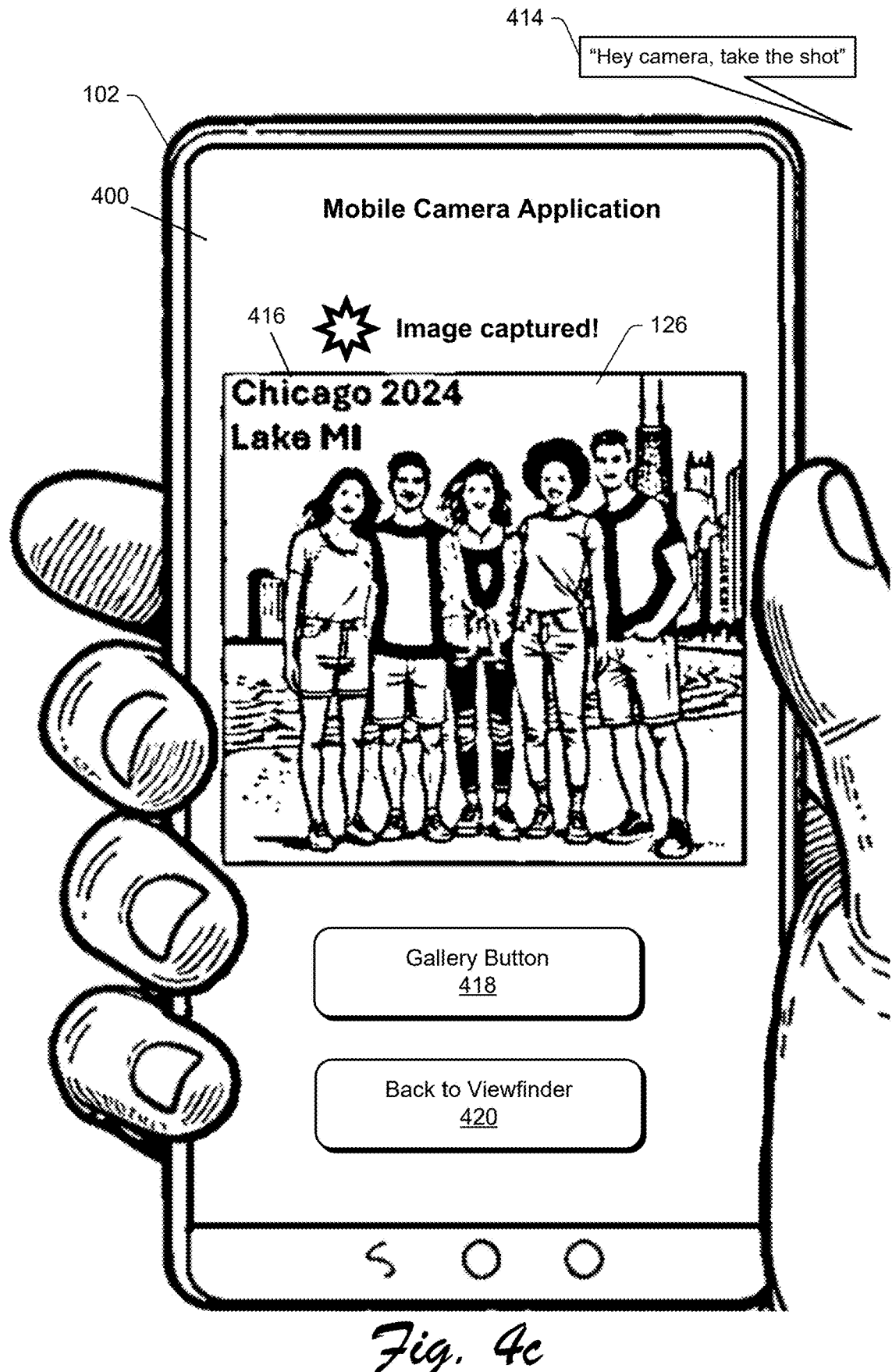
FIG. 4*c* depicts an example GUI in accordance with one or more implementations.

FIG. 4a, FIG. 4b, and FIG. 4c each depict an example GUI 400. The GUI 400, for instance, whether a continuation of the GUI 300 or unrelated to the GUI 300, is implemented on the mobile device 102 by incorporating attributes of the environment 100 and the system 200 introduced above. The camera application 114 controls the GUI 400 to provide access to the camera 104, and additional capability enabled by the AI model 128. When the camera application 114 is executed the user interface 116 causes a touchscreen of the mobile device 102 to present the GUI 400, for instance, and may receive user inputs as the user 112 interacts with the GUI 400.

FIG. 4a depicts aspects of the GUI 400 in accordance with one or more implementations. The GUI 400 depicted in FIG.

4a is presented on a display screen 402 of the mobile device 102 to show a camera control 404 for controlling the camera 104. The viewfinder 118 is included in a center region of the camera control 404 for previewing the final image 126 to be output from the camera application 114. The camera control 404 further includes a capture button 406 and a voice assistance selection 408 depicted as selectable graphical elements and used to perform similar functionality as the capture button 306 and the voice assistance selection 308.

The GUI 400 may represent a subsequent interaction between the user 112 and the camera application 114 that occurs after the user 112 interacts with the GUI 300. For example, the voice command 310, the voice command 312, and the voice command 314 are stored in the conversation history 210 accessible to the AI model 128 when the GUI 400 is being shown. For example, rather than present the image preview 120 in the viewfinder 118 of the camera control 404, the modified image 136 is shown, which has the user preferences from that previous session (or multiple previous sessions) already applied to the modified image 136. For example, based further on the conversation history 210 of voice commands received at the user interface 116 during past user interactions, the modified image 136 is shown in the viewfinder 118 to depicts the group of friends with the kite added to the background and the other people removed. The user 112 speaks a voice command 410 by stating, "Hey Camera, do the same but instead of a kite, label Chicago in the background."

FIG. 4b depicts aspects of the GUI 400 in accordance with one or more implementations. The GUI 400 depicted in FIG. 4b shows the modified image 136 generated by the AI model 128 based on the voice command 412 and the conversation history 210. For example, the viewfinder 118 displays text overlaid on the modified image 136 that states "Chicago 2024 Lake MI." This shows how in some examples, the AI model 128 generates the modified image 136 based further on contextual information associated with the mobile device 102 and/or user preference information (e.g., camera settings, the conversation history 210). The voice command 410 requested a place name be added as an image feature of the modified image 136, and the AI model 128 improved on that request by using object recognition, device localization, sensor data, and other types of contextual information to derive a context for the voice command 410 and the modification request. In some examples, the contextual information is inferred from portions of the environment 100 shown in the image preview 120 or the modified image 136. The AI model 128, for example, recognizes the Chicago skyline in the background of the modified image 136 or the image preview 120 to infer that the friends are standing near Lake Michigan. In another example, the AI model 128 receives location information about the mobile device 102 and determines that Lake Michigan is depicted nearby in the image preview 120 or the modified image 136. Also depicted in FIG. 4b is a voice command 412 being detected from the user 112. The user instructions 134 extracted from the voice command 412 describe "automatically restyle and flatten shading effects" based on the user 112 speaking, "Hey Camera, restyle and flatten shading."

FIG. 4c depicts aspects of the GUI 400 in accordance with one or more implementations. The GUI 400 depicted in FIG. 4c illustrates aspects of the AI model 128 being configured to generate image results 416 included in the GUI 400 to present the final image 126 having the image features requested by the user instructions 134. For example, in response to the voice command 414 where the user speaks "Hey Camera, take the shot", the camera application 114 outputs the capture command 122, which causes the AI model 128 to output the final image 126 through the output interface 222. As depicted in the image results 416, the final image 126 includes each of the modifications requested from the voice command 410 and the voice command 412 (e.g., to replace the kite with the text label, restyle, and flatten shading). A selectable element 418 navigates from the GUI 400 to a gallery application to interact with the final image 126 similar to the selectable element 318 in relation to the GUI 300. A selectable element 420 navigates the GUI 400 back to the camera control 404, similar to the selectable element 320 in relation to the GUI 300.

Figure 5:
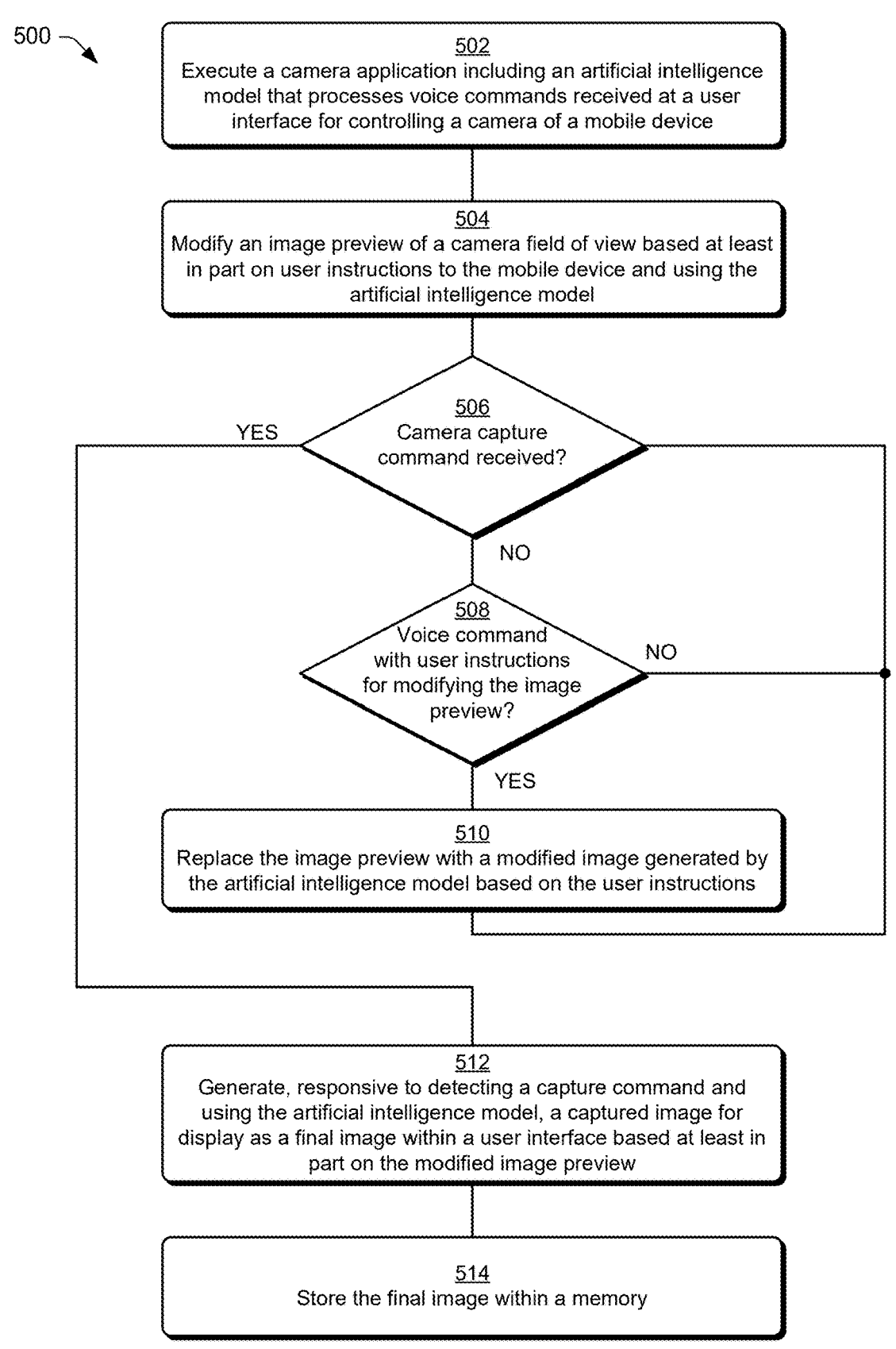
FIG. 5 illustrates a flow chart depicting an example method for AI enhanced mobile camera interfaces in accordance with one or more implementations.

FIG. 5 illustrates a flow chart depicting an example method 500 for AI enhanced mobile camera interfaces in accordance with one or more implementations. Operations of the method 500, for instance, may be performed in the context of the environment 100, such as by the mobile device 102 and/or the system 200.

At operation 502, a camera application is executed including an artificial intelligence model that processes voice commands received at a user interface for controlling a camera of a mobile device. For example, the camera application 114 is launched on the mobile device 102, which in turn invokes the AI model 128 to process voice commands detected at the user interface 116 used for taking pictures with the camera 104.

Next, at operation 504, based at least in part on user instructions to the system and using an artificial intelligence model, an image preview of a camera field of view is modified. In some examples, the user interface 116 is controlled by the camera application 114 to include the camera control 304, which displays the image preview 120 inside the viewfinder 118. The image preview 120 is replaced with the modified image 136 generated by the AI model 128 based on the user instruction 134 the mobile device 102 receives as input.

At operation 506, the method 500 includes determining whether a capture command is received at the user interface for causing the camera to output a captured image of the field of view. For example, the camera application 114 presents the image preview 120 in the viewfinder 118. The image preview 120 is refreshed as the user 112 holding the mobile device 102 moves the camera 104. A YES out of the operation 506 happens, for example, when the user 112 presses the capture button 306 or speaks the voice command 314, the camera application 114 sends the capture command 122 to the camera 104 to generate the captured image 124. A NO out of the operation 506 occurs before the capture command 122 is output to the camera 104, for example, to refresh the user interface 116 and the viewfinder 118 with updated image previews.

At operation 508, the method 500 further includes determining whether a voice command at the user interface indicates user instructions for modifying the image preview. If the microphone 204, for example, does not detect the voice command 132, a NO out of the operation 508 occurs and the method 500 returns to the operation 506. If, however, the microphone 204 picks up the voice command 132 and the voice recognition model 206 extracts the user instructions 134, then a YES out of the operation 508 happens and the method 500 proceeds to operation 510.

At operation 510, the image preview is replaced with a modified image generated by the AI model based on the user instructions. For example, the image preview 120 is replaced with the modified image 136 generated by the AI model 128 based on the user instruction 134 extracted from the voice command 310 and/or the voice command 312.

In some examples, the voice command 132 includes multiple commands, or a plurality of different instructions for modifying the image preview 120. For example, the user instructions 134 include multiple steps, multiple changes, etc. The operations 508 and 510 are repeated before the capture command 122 is received to iteratively process the different instructions to replace the image preview 120 with a different version of the modified image 136 generated by the AI model 128 for each different instruction. For example, the AI model 128 applies a first change to an iterative version of the modified image 136, then applies a second change, a third change, etc. as the changes are reach indicated by the user instructions 134. If the voice command 132 indicates a specific order to the different instructions, the AI model 128 may iteratively process the different instructions in that specific order. For example, if two or more operations derived from the user instructions 134 of the voice command 132 are interrelated and share a dependency (e.g., one happens before another), then the AI model 128 performs the two operations according to that dependency.

The AI model 128 may be trained and retrained to interpret various types of voice commands and user speech. For example, if the voice command 132 indicates, "Hey Camera, brighten the face by 10%," then the textual prompt 218 input to the AI image generator 220 includes the user instructions 134 to "lighten a group of pixels in a region that corresponds to a face." The AI model 128 outputs the modified image 136 to replace the image preview 120 within the viewfinder 118. As another example, the voice command 132 indicates, "Hey Camera, remove the traffic lights." The modified image 136 output from the AI model 128 omits image features of the image preview 120 that are classified by the AI model 128 to be traffic lights. As other examples, the voice command 132 indicates, "Hey Camera, enable low-light pro mode settings," "Hey Camera, enable low-light pro mode settings," "Hey Camera, make sky bluer and increase contrast," "Hey Camera, increase texture of background without changing the brightness," "Hey Camera, blur the background and focus on foreground of the image," "Hey Camera, remove the people in the background," "Hey Camera, brighten the stars in the sky," and "Hey Camera, remove the shadows on my face." The modified image 136 output from the AI model 128 alters image features of the image preview 120 to generate the modified image 136 that satisfies the user instructions 134.

At operation 512, responsive to detecting the capture command and using the artificial intelligence model, a captured image is generated for display as a final image within a user interface based at least in part on the modified image preview. For example, the AI model 128 generates the final image 126 by adding image feature differences between the modified image 136 and the image preview 120 to the captured image 124. In at least one example, the final image 126 is produced by using a preview version of the modified image 136. For example, the modified image 136 produced from the image preview 120 just prior to the capture command 122 is a better quality shot than the captured image 124. The output interface 222 may cause the final image 126 to be output from the camera application 114 instead of the captured image 124.

At operation 514, the final image is stored within a memory. For example, the final image 126 is output from the camera application 114 and a processor of the mobile device 102 causes the final image 126 to be stored within the image data 110 maintained within the memory 108.

The example methods described above may be performed in various ways, such as for implementing different aspects of the systems and scenarios described herein. Any services, components, modules, methods, and/or operations described herein can be implemented using software, firmware, hardware (e.g., fixed logic circuitry), manual processing, or any combination thereof. Some operations of the example methods may be described in the context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 6:
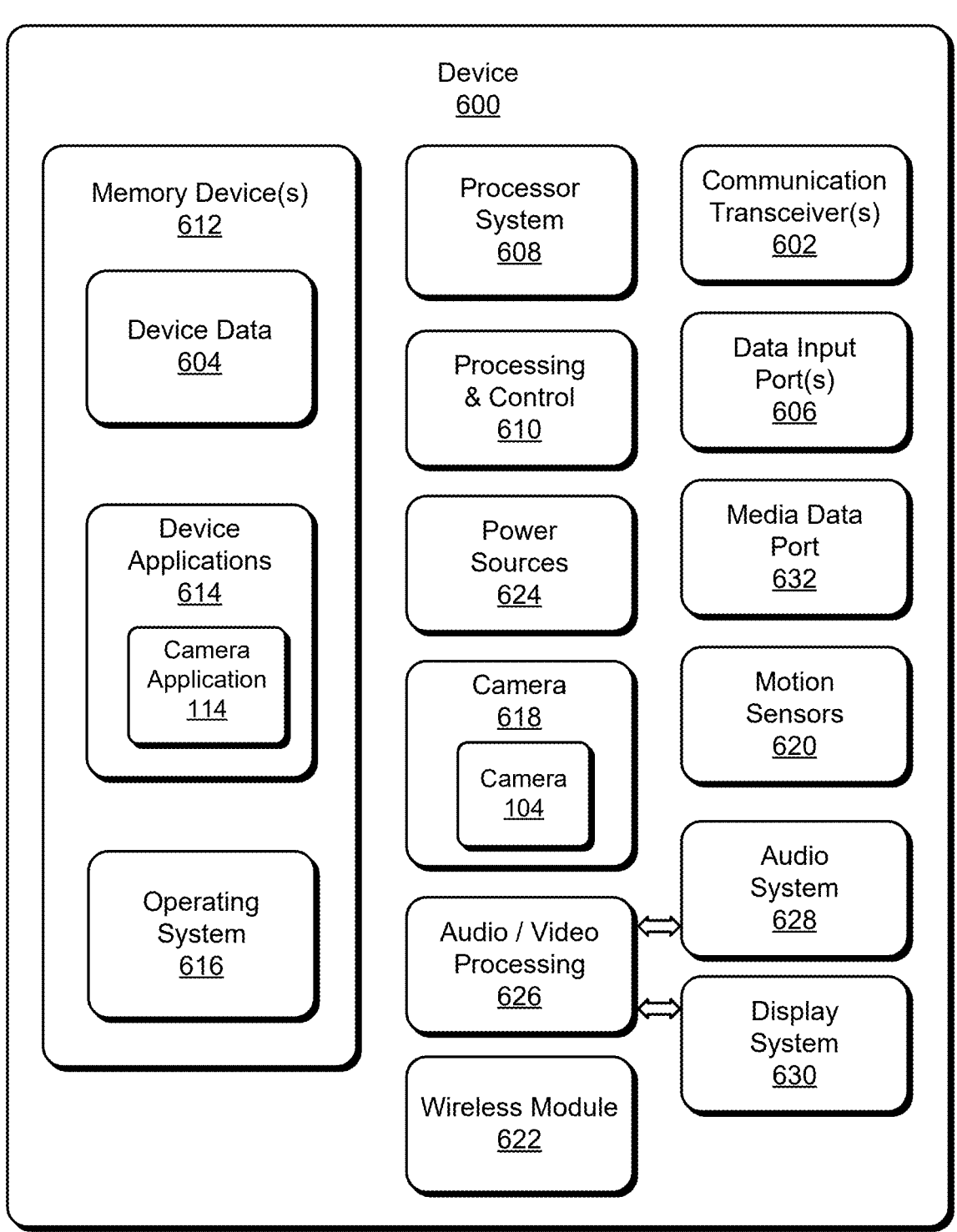
FIG. 6 illustrates various components of an example device in which aspects of AI enhanced mobile camera interfaces can be implemented in accordance with one or more implementations.

FIG. 6 illustrates various components of an example device in which aspects of AI enhanced mobile camera interfaces can be implemented in accordance with one or more implementations. The device 600 can be implemented as any of the devices described with reference to the previous FIGS. 1-5, such as any type of mobile device, mobile phone, wearable device, tablet, computing device, communication device, entertainment device, gaming device, media playback device, and/or other type of electronic device. For example, aspects of the mobile device 102 and/or the system 200, as shown and described with reference to FIGS. 1-5 may be implemented as the example device 600.

The device 600 includes communication transceivers 602 that enable wired and/or wireless communication of device data 604 with other devices. The device data 604 can include any of device identifying data, device location data, wireless connectivity data, and wireless protocol data. Additionally, the device data 604 can include any type of audio, video, and/or image data. The device data 604 can include any type of communication data, such as radio measurements and radio messages. Example communication transceivers 602 include wireless personal area network (WPAN) radios compliant with various IEEE 802.15 (Bluetooth™) standards, wireless local area network (WLAN) radios compliant with any of the various IEEE 802.10 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory 612 can include various implementations of random access memory (RAM), read-only memory (ROM), flash memory, and other types of storage media in various memory device configurations. The device 600 may also include a mass storage media device. Computer-readable storage memory 612 represents media and/or devices that enable persistent and/or non-transitory storage of information in contrast to mere signal transmission, carrier waves, or signals per se. Computer-readable storage memory 612 do not include signals per se or transitory signals.

The computer-readable storage memory 612 provides data storage mechanisms to store the device data 604, other types of information and/or data, and various device applications 614 (e.g., software applications). The device applications 614 include the camera application 114 and/or the AI model 128, for instance. As another example of device programs maintained in the computer-readable storage memory 612 include instructions for an operating system 616. The instructions can be maintained as software instructions within the memory 612 and executed by the processing system 608. The device applications 614 may also include a device manager, such as any form of a control application, software application, signal-processing and control module, code that is native to a particular device, a hardware abstraction layer for a particular device, and so on.

In this example, the example device 600 also includes a camera 618 and motion sensors 620, such as may be implemented in an inertial measurement unit (IMU). The motion sensors 620 can be implemented with various sensors, such as a gyroscope, an accelerometer, and/or other types of motion sensors to sense motion of the device. The various motion sensors 620 may also be implemented as components of an inertial measurement unit in the device. The camera 618 is an example of the camera 104 and is usable by the camera application 114 to capture images, including the captured image 124. The motion sensors 620 are used as input devices, for example, to detect when the user 112 is holding the device 600 with the camera 618 pointed away, including to compensate for movement when the user 112 frames the viewfinder 118 to capture a scene.

The device 600 also includes a wireless module 622, which is representative of functionality to perform various wireless communication tasks. For example, the camera application 114 communicates the captured image 124 or the final image 126 to a remote service through a network connection established by the wireless module 622 to a network.

The device 600 can also include one or more power sources 624, such as when the device is implemented as a mobile device. The power sources 624 may include a charging and/or power system, and can be implemented as a flexible strip battery, a rechargeable battery, a charged super-capacitor, and/or any other type of active or passive power source.

The device 600 also includes an audio and/or video processing system 626 that generates audio data for an audio system 628 and/or generates display data for a display system 630. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 632. In implementations, the audio system and/or the display system are integrated components of the example device. Alternatively, the audio system and/or the display system are external, peripheral components to the example device.

Although implementations of embedding nearby user presence within captured images have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a mobile device, including: at least one memory, and at least one processor coupled with the at least one memory and configured to cause the mobile device to: modify, based at least in part on user instructions to the mobile device and using an artificial intelligence model, an image preview of a camera field of view presented on the mobile device, replace the image preview with a modified image preview generated by the artificial intelligence model based on the user instructions, and generate, responsive to detecting a capture command and using the artificial intelligence model, a captured image for display as a final image within a user interface based at least in part on the modified image preview.

In some aspects, the techniques described herein relate to a mobile device, wherein the user instructions are extracted by the artificial intelligence model from a voice command received at the user interface.

In some aspects, the techniques described herein relate to a mobile device, wherein the voice command indicates one or more instructions for modifying the image preview, wherein the artificial intelligence model is configured to iteratively process the one or more instructions to replace the image preview with a different image generated by the artificial intelligence model for each different instruction, and wherein the different image generated for a final instruction corresponds to the modified image.

In some aspects, the techniques described herein relate to a mobile device, wherein the artificial intelligence model is configured to generate the modified image by at least one of adding, removing, or manipulating image features requested by the user instructions.

In some aspects, the techniques described herein relate to a mobile device, wherein the artificial intelligence model is configured to generate the modified image by applying image enhancements requested by the user instructions.

In some aspects, the techniques described herein relate to a mobile device, wherein the artificial intelligence model is configured to generate the modified image based further on semantic information extracted from the image preview.

In some aspects, the techniques described herein relate to a mobile device, wherein the artificial intelligence model is configured to generate the modified image based further on a textual prompt combining a transcription of the user instructions with semantic information extracted from the image preview.

In some aspects, the techniques described herein relate to a mobile device, wherein the artificial intelligence model is configured to generate the modified image based further on a conversation history of the user instructions received at the user interface during past user interactions.

In some aspects, the techniques described herein relate to a mobile device, wherein the artificial intelligence model is configured to generate the modified image based further on contextual information associated with the mobile device and user preference information.

In some aspects, the techniques described herein relate to a mobile device, wherein the contextual information is inferred from portions of an environment shown in the image preview.

In some aspects, the techniques described herein relate to a system including: at least one memory, and at least one processor coupled with the at least one memory and configured to cause the system to: modify, based at least in part on user instructions to the system and using an artificial intelligence model, an image preview of a camera field of view presented by the system, replace the image preview with a modified image preview generated by the artificial intelligence model based on the user instructions, and generate, responsive to detecting a capture command and using the artificial intelligence model, a captured image for display as a final image within a user interface based at least in part on the modified image preview.

In some aspects, the techniques described herein relate to a system, wherein the artificial intelligence model is configured to generate the modified image by at least one of adding, removing, or manipulating image features requested by the user instructions, and by applying image enhancements requested by the user instructions.

In some aspects, the techniques described herein relate to a system, wherein the artificial intelligence model is configured to generate the modified image based further on semantic information extracted from the image preview.

In some aspects, the techniques described herein relate to a system, wherein the artificial intelligence model is configured to generate the modified image based further on a textual prompt combining a transcription of the user instructions with semantic information extracted from the image preview.

In some aspects, the techniques described herein relate to a system, wherein the artificial intelligence model is configured to generate the modified image based further on a conversation history of user instructions received at the user interface during past user interactions.

In some aspects, the techniques described herein relate to a system, wherein the artificial intelligence model is configured to generate the modified image based further on contextual information inferred from portions of the image preview and user preference information.

In some aspects, the techniques described herein relate to a method performed by a mobile device, the method including: executing, by at least one processor of a mobile device, a camera application including an artificial intelligence model that processes voice commands received at a user interface for controlling a camera of the mobile device, presenting, by the at least one processor, a camera viewfinder within the user interface including an image preview of a field of view of the camera, detecting, by the at least one processor, a voice command at the user interface that indicates user instructions for modifying the image preview, replacing, by the at least one processor, the image preview with a modified image generated by the artificial intelligence model based on the user instructions, receiving, by the at least one processor, a capture command at the user interface that causes the camera to output a captured image of the field of view, using, by the at least one processor, the artificial intelligence model to generate a final image by applying same modifications to the captured image as applied by the artificial intelligence model to the image preview to generate the modified image, and storing, by the at least one processor, the final image within a memory.

In some aspects, the techniques described herein relate to a method, wherein the voice command indicates a plurality of different instructions for modifying the image preview, and the replacing includes iteratively processing the different instructions to replace the image preview with a different image generated by the artificial intelligence model for each different instruction.

In some aspects, the techniques described herein relate to a method, wherein the voice command indicates a specific order to the different instructions, and wherein the iteratively processing includes iteratively processing the different instructions in that specific order.

In some aspects, the techniques described herein relate to a method, wherein the replacing includes using the artificial intelligence model for at least one of adding image features, removing the image features, manipulating the image features, or applying image enhancements.

The invention claimed is:

1. A mobile device, comprising:
at least one memory; and
at least one processor coupled with the at least one memory and configured to cause the mobile device to:
modify, based at least in part on user instructions to the mobile device and using an artificial intelligence model, an image preview of a camera field of view presented on the mobile device;
replace the image preview with a modified image preview generated by the artificial intelligence model based on the user instructions; and
generate, responsive to detecting a capture command and using the artificial intelligence model, a captured image for display as a final image within a user interface based at least in part on the modified image preview.

2. The mobile device of claim 1, wherein the user instructions are extracted by the artificial intelligence model from a voice command received at the user interface.

3. The mobile device of claim 2, wherein the voice command indicates one or more instructions for modifying the image preview, wherein the artificial intelligence model is configured to iteratively process the one or more instructions to replace the image preview with a different image generated by the artificial intelligence model for each different instruction, and wherein the different image generated for a final instruction corresponds to the modified image.

4. The mobile device of claim 1, wherein the artificial intelligence model is configured to generate the modified image by at least one of adding, removing, or manipulating image features requested by the user instructions.

5. The mobile device of claim 1, wherein the artificial intelligence model is configured to generate the modified image by applying image enhancements requested by the user instructions.

6. The mobile device of claim 1, wherein the artificial intelligence model is configured to generate the modified image based further on semantic information extracted from the image preview.

7. The mobile device of claim 1, wherein the artificial intelligence model is configured to generate the modified image based further on a textual prompt combining a transcription of the user instructions with semantic information extracted from the image preview.

8. The mobile device of claim 1, wherein the artificial intelligence model is configured to generate the modified image based further on a conversation history of the user instructions received at the user interface during past user interactions.

9. The mobile device of claim 1, wherein the artificial intelligence model is configured to generate the modified image based further on contextual information associated with the mobile device and user preference information.

10. The mobile device of claim 9, wherein the contextual information is inferred from portions of an environment shown in the image preview.

11. A system comprising:
at least one memory; and
at least one processor coupled with the at least one memory and configured to cause the system to:
    modify, based at least in part on user instructions to the system and using an artificial intelligence model, an image preview of a camera field of view presented by the system;
    replace the image preview with a modified image preview generated by the artificial intelligence model based on the user instructions; and
    generate, responsive to detecting a capture command and using the artificial intelligence model, a captured image for display as a final image within a user interface based at least in part on the modified image preview.

12. The system of claim 11, wherein the artificial intelligence model is configured to generate the modified image by at least one of adding, removing, or manipulating image features requested by the user instructions, and by applying image enhancements requested by the user instructions.

13. The system of claim 11, wherein the artificial intelligence model is configured to generate the modified image based further on semantic information extracted from the image preview.

14. The system of claim 11, wherein the artificial intelligence model is configured to generate the modified image based further on a textual prompt combining a transcription of the user instructions with semantic information extracted from the image preview.

15. The system of claim 11, wherein the artificial intelligence model is configured to generate the modified image based further on a conversation history of user instructions received at the user interface during past user interactions.

16. The system of claim 11, wherein the artificial intelligence model is configured to generate the modified image based further on contextual information inferred from portions of the image preview and user preference information.

17. A method performed by a mobile device, the method comprising:
    executing, by at least one processor of a mobile device, a camera application including an artificial intelligence model that processes voice commands received at a user interface for controlling a camera of the mobile device;
    presenting, by the at least one processor, a camera viewfinder within the user interface including an image preview of a field of view of the camera;
    detecting, by the at least one processor, a voice command at the user interface that indicates user instructions for modifying the image preview;
    replacing, by the at least one processor, the image preview with a modified image generated by the artificial intelligence model based on the user instructions;
    receiving, by the at least one processor, a capture command at the user interface that causes the camera to output a captured image of the field of view;
    using, by the at least one processor, the artificial intelligence model to generate a final image by applying same modifications to the captured image as applied by the artificial intelligence model to the image preview to generate the modified image; and
    storing, by the at least one processor, the final image within a memory.

18. The method of claim 17, wherein the voice command indicates a plurality of different instructions for modifying the image preview, and the replacing includes iteratively processing the different instructions to replace the image preview with a different image generated by the artificial intelligence model for each different instruction.

19. The method of claim 18, wherein the voice command indicates a specific order to the different instructions, and wherein the iteratively processing includes iteratively processing the different instructions in that specific order.

20. The method of claim 17, wherein the replacing includes using the artificial intelligence model for at least one of adding image features, removing the image features, manipulating the image features, or applying image enhancements.

* * * * *